(12) United States Patent
Annett

(10) Patent No.: US 9,769,613 B1
(45) Date of Patent: *Sep. 19, 2017

(54) SYSTEM AND METHOD FOR PROVIDING TIMELY MESSAGES BASED ON ARRIVAL AT A LOCATION

(71) Applicant: Mark Shaffer Annett, Livingston, NJ (US)

(72) Inventor: Mark Shaffer Annett, Livingston, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/365,011

(22) Filed: Nov. 30, 2016

Related U.S. Application Data

(63) Continuation of application No. 14/852,669, filed on Sep. 14, 2015, now Pat. No. 9,544,735, which is a continuation of application No. 13/614,604, filed on Sep. 29, 2012, now Pat. No. 9,161,171.

(51) Int. Cl.
| | |
|---|---|
| H04W 4/02 | (2009.01) |
| H04L 12/58 | (2006.01) |
| H04W 64/00 | (2009.01) |
| H04W 4/00 | (2009.01) |
| H04L 29/08 | (2006.01) |

(52) U.S. Cl.
CPC ............ H04W 4/023 (2013.01); H04L 51/20 (2013.01); H04W 4/003 (2013.01); H04W 64/003 (2013.01); H04L 67/10 (2013.01)

(58) Field of Classification Search
CPC ... H04W 4/023; H04W 4/003; H04W 64/003; H04L 51/20; H04L 67/10
USPC .......................... 455/456.1–457, 414.1–414.3
See application file for complete search history.

(56) References Cited

U.S. PATENT DOCUMENTS

| | | | |
|---|---|---|---|
| 7,458,184 B2 | 12/2008 | Lohtia | |
| 8,005,489 B2 | 8/2011 | Fransioli | |
| 8,019,532 B2 | 9/2011 | Sheha | |
| 8,099,105 B2 | 1/2012 | Morin | |
| 8,190,692 B1 | 5/2012 | Zilka | |
| 8,214,549 B2 | 7/2012 | Dicks | |
| 2004/0199056 A1* | 10/2004 | Husemann | A61B 5/0002 600/300 |
| 2005/0143909 A1 | 6/2005 | Orwant | |
| 2008/0274769 A1* | 11/2008 | Linden | G06F 3/011 455/556.1 |
| 2010/0191186 A1* | 7/2010 | Blumberg, Jr. | A61M 5/1413 604/151 |
| 2011/0215933 A1 | 9/2011 | Darling, IV | |

(Continued)

OTHER PUBLICATIONS

Author: David H. Gustafson et al. Title: An Ehealth Solution for People With Alcohol Problems Publication: The Journal of the National Institute on Alcohol Abuse and Alcoholism, vol. 33, Issue No. 4, pp. 327-337 Publisher: The National Institute on Alcohol Abuse and Alcoholism (NIAAA).

*Primary Examiner* — Sharad Rampuria

(57) ABSTRACT

A system and method for retrieving both public and private location-based messages. The system and method utilize location-based services and processing to determine when the mobile device has arrived at, is in the vicinity of, is dwelling at, and has left a particular location and then can deliver private messages based upon this information and other user specified criteria. Additionally upon arrival at new location, the mobile device will query a server to determine if there is any category specific public information related to this new location.

20 Claims, 8 Drawing Sheets

(56) References Cited

U.S. PATENT DOCUMENTS

| | | | |
|---|---|---|---|
| 2014/0039911 A1* | 2/2014 | Iyer | G06Q 50/22 705/2 |
| 2015/0064210 A1* | 3/2015 | GuhaThakurta | G01N 33/564 424/192.1 |

* cited by examiner

Sample Input Screen

Ideas for Healthier Choices

Places I need to avoid or make better choices when I go there.

Address: *1600 Pennsylvania Ave., Washingt*

Days of the week: All Days ●
○ Mon ○ Tues ○ Wed ○ Thurs ○ Fri ○ Sat ○ Sun

Time of Day: Any ● From ▢ To ▢

People that make things worse:
+ [                                    ]

Events that make things worse:
+ [                                    ]

My ideas for Healthy Choices:
+ [                                    ] ○ 🎤

● Keep Private    ○ Share this idea with others

Send message  ● Arrival  ▢ Miles

People to contact if I need help:
+ [        ] [        ] [        ]
   Name       Email      Text

Fig. 5

Sample Output Screen

SYSTEM AND METHOD FOR PROVIDING TIMELY MESSAGES BASED ON ARRIVAL AT A LOCATION

BACKGROUND

Location-based services (LBS) are a general class of computer program-level services that provide access to location and time data as control features in computer programs. LBS are typically utilized to provide you with information specifically tailored to your current location. Google for example has the ability to provide search (and advertizing) that is tailored to your current location. For example, if you type "movie theaters" into Google what appears at the top of the search engine are the movie theater locations that are closest to your current location and not the millions of movie theaters across the country. (Note: even if you do not give Google direct access to your location, it can still locate you through LBS associated with your IP address.)

LBS are becoming increasingly popular in everyday devices and in particular within mobile devices due to their increasing power, memory, and capabilities. What once required a computer the size of a house to do is now available on someone's mobile phone.

LBS are now being incorporated into all mobile smart phones. For example, for both the iPhone and iPad one of the newest application associated with the iOS 5 operating is Reminders. Reminders is a location-based organization tool that aims to offer an improved to-do lists and one of its features is that it can provide location-based alerts, such as reminding a user to buy milk when they arrive at the grocery store.

The use of LBS by mobile apps is still in its infancy and have yet to be fully embraced by most mobile customers. For the apps that have been created so far, most of the current apps have either a social or a marketing component. The table below highlights some representative apps that use LBS.

| Name | Description |
| --- | --- |
| Babbleville | Babbleville is a web and phone-based service that allows you to create location-based message boards and messages. When other users approach the location, it will automatically show up on their screen, allowing users to communicate with other users nearby in an anonymous and secure way. |
| Banjo | Banjo connects with your Facebook and Twitter accounts and sends you a push notification when your friends are close by. |
| ChatSquare | ChatSquare is a service that lets you chat with other people in the same location. For example, if you're at a night club, you can chat online with others visitors, the bartender, or even the bouncer. |
| Dropp | Dropp functions as a location-based reminder app that will trigger when you enter an area. It also has secondary use as a personalized messaging service that allows you to drop text or picture messages in an area that will be picked up by friends or family automatically. |
| foursquare | foursquare is an app that allows you to store information about places that you have visited that can later be picked up by your friends and other like minded individuals. |
| GeoNotes | GeoNotes is a location-based reminder system allowing you to receive personal or public pop-up reminders as you leave or arrive at any location. Unique to the system is the ability to specify "layers", which are essentially public messages groups that you can belong to. |
| LoKast | LoKast, which is actually short for "local-casting," connects people in its network based on proximity. Once you set up a profile with all of your photos, selected contacts, videos, web links and music on your mobile phone. |
| MessageParty | MessageParty is a location-based chat room app. When you open the app, you'll see a list of chat rooms that have been created within 1000 feet of you, so you choose one to your liking to join in. |
| PlacePunch | PlacePunch provides location-based marketing solutions that make it easy for you to incorporate marketing campaigns that integrate with Foursquare, Facebook and Twitter. |
| Repudo | With Repudo you can drop all kinds of multimedia like a text, a photo, a video or an audio message at any location you like. Once the message is picked up it is gone from the map. It is now on your phone and only you can decide what to do with it. |
| Yobongo | Yobongo is an app that serendipitously connects nearby strangers in chatroom-like environments. When you open the application, you are automatically dropped in a chat room - based on your GPS location - where you can start chatting with others. |

The way these apps work in very similar to the method specified in U.S. Pat. No. 8,005,489 (inventor: Frank E. Fransioli). In this patent, the current location information is repeatedly determined within the portable wireless device and then sent to a server for processing. Once received by the server, the location information is then tracked and processed to determine if a specified criteria has been met, which in this particular patent can be based both location and direction of travel criteria. If the criteria has been met then a message is sent back to the portable wireless device.

There are two deficiencies of this type of system. The first is privacy and the second is cost.

With respect to privacy, the user's current position is repeatedly being sent to the server and is being monitored and processed elsewhere. While this might not be a big deal for someone who wants to be reminded about buying milk when they arrive at the grocery store, this is not true of a registered sexual predator that may want to, as a reminder to stay away, be notified whenever he/she is within 500 feet of a particular elementary school. Such an individual might be terrified of using such a system if they knew their position information was constantly being monitored on a server.

The lack of privacy would potentially be an issue for people with all sorts of medical and mental health issues, particularly those associated with addictions and healthy lifestyles that often have destructive behavior associated with a particular location. For example, a substance abuser that wants to stay away from a particular location that he previously purchased illegal substances at might not want the location to be located somewhere else. Or, someone who is pre-diabetic and might be interested in making healthier eating choices when they arrive at a particular restaurant might be concerned about being a member of a public group since this is health related information.

The other big issue is cost. While the apps themselves may be free, the processing of the location information is done on the server side and the mobile device must constantly be sending data to the server, which is not free. While there is definitely a financial cost associated with having to repeatedly send data back and forth to a server, there is also significant cost in battery power consumption, which can be even more important to users than the financial aspect.

Additionally, by having the processing done on the server there is a processing delay due to communication time and a big cost in processing resources, since communication is traditionally a very resource intensive process.

In order to overcome some of the cost issues associated with a system where all of the processing and position tracking is done at the server, in U.S. Pat. No. 8,099,105 (inventor Drew Morin) a hybrid system was developed. In this system, as the mobile device moves around it produces specific events (such as coming in contact with a new network tower), which causes all of the points of interest information within a specified region to be downloaded to the mobile device. The mobile device then takes over and is responsible for tracking proximity to the newly down loaded points of interest and determining when to display information related to a specific point. While this is certainly an improvement in terms of the associated costs, it does nothing to address the privacy issues, since all of the information is still stored on the server. Additionally, the process still exchanges data more often than is typically necessary or desirable. As someone is driving down the street, heading towards a destination, they don't need to know that they are passing a sale at Barney's Department Store, even though an advertiser certainly would want them to know that fact.

Constantly getting updates of all the potential sites around you is an advertiser dream but is not something that most people need. Additionally, distracted driving is becoming a national crisis and being bombarded by information that someone needs to take their eyes off the road to view is certainly not desirable, nor is it typically valuable, since most people are on their way to a particular destination and don't have the time to be distracted.

At the other end of the spectrum is the personal location-based "Reminders" app previously mentioned. In this system, the position is tracked within the mobile device itself, using the LBS provided as part of the notification system in iOS 5. This app overcomes many of the privacy and cost related issues of the system above but is limited in that it only has access to the information that is stored within it. Imagine being a user that was addicted to the lottery having to input every single location in the state in which lottery tickets are sold. While they might reasonably input the locations closest to them, they could be traveling a couple of towns away from home and still need a reminder not to buy that lottery ticket when they enter that deli to buy lunch.

An interesting application of location-based services is part of a system currently being developed by scientists at NorthWestern University (IL) called, "Mobilyze!". Mobilyze! is a mobile phone application and supporting architecture, in which machine learning models are used to try and predict a patients' mood, emotions, cognitive/motivational state. It reportedly uses at least 38 concurrent sensor values including global positioning system, ambient light, and recent calls to try and predict when a patient is feeling depressed. When it senses a pattern that might be indicative of a depressed state, the intention is that the system will act as a virtual therapist and offer suggestions such as, "I notice that you haven't been out of the house for a couple of days, why don't you go for a walk in the park or call your sister."

While Mobilyze! is a unique therapeutic tool, it is more of a reactive system more suited to mental health conditions such as major depressive disorder. However, for many other medical and mental health issues, particularly those associated with addictions and healthy lifestyles, the trigger is often purely based upon a location, such as a compulsive gambler coming within 25 miles of Atlantic City, N.J. Or, it might be based upon location and a particular time of day, such as a compulsive overeater arriving at White Castle after 10 PM at night. Or, it might be based upon a location and environmental factors such as the presence of particular people (e.g. a fellow substance abusers being present at your sister's house) and situations (such as a family event where everybody is toasting one another). In the cases above, the triggers of undesirable behavior are known and there is no need to resort to predictive modeling. In this type of situation, what the individual often simply needs is a timely reminder of their intervention strategies in order to make healthier/better choices.

Therefore, there is a need for a location-based message system where the information is kept private (locally on the individuals mobile device) that also combines the ability to query for public messages in a manner that is low cost.

SUMMARY

In order to overcome the deficiencies in the prior art, a wireless device location-based messaging system and methods of providing location-based messaging are described herein.

The wireless device location-based messaging system includes at least one or more locally stored database of information related to particular geographic locations and one or more network based database. The system includes the ability to detect arrival at a new location and the ability to present information related that specific location.

The system further contains the ability to establish an anonymous connection the network database; the ability to trigger events based upon dwelling, exiting, and being in proximity of a particular location; and is ideally suited to providing location-based therapeutic intervention related to helping people make better choices.

A method of providing location-based messaging that includes accessing at least one or more locally stored database of information related to particular geographic locations and one or more network based database. The method includes detecting the arrival of the user at a new location and then presenting the information related that specific location.

The method further contains establishing an anonymous connection to the network database; triggering events based upon dwelling, exiting, and being in proximity of a particular location; and is ideally suited to providing location-based therapeutic intervention related to helping people make better choices.

A method of providing location-based therapeutic messaging that includes accessing at least one or more database of information related to particular geographic locations. The method includes detecting the arrival of the user at a new location and then presenting therapeutic interventions related that specific location.

The method further contains establishing an anonymous connection to one or more of the databases of particular geographic locations; triggering events based upon dwelling, exiting, and being in proximity of a particular location; and is ideally suited to providing therapeutic intervention related to helping people make better choices.

BRIEF DESCRIPTION OF THE DRAWINGS

FIG. 5 illustrates a sample user input screen;

DETAILED DESCRIPTION

There are multiple methods for determining precise location (e.g., assisted GPS (AGPS), Time Difference of Arrival (TDOA), etc.), some of which are network centric and some of which are device centric. The recent trend in wireless devices has been driving more and more processing power into the device itself. As a result, a wireless device is not only capable of determining its precise location on its own but is also cable of using and tracking relevant location-based information. Examples of the types of relevant location-based information not only includes position, velocity, and direction data but also includes but is not limited to location specific advertising, blog, video, multimedia content, web page, an automatically dialed phone call, pop-up, or other.

The term location-based services (LBS) generally relates to consumer and commercial applications that utilize the knowledge of a device user's geographic position. While a location such as street address can be entered directly by a user, as referred to herein location-based services (LBS) relates to location information that is obtained electronically, such as using a wireless device's global positioning system (GPS) in order to obtain a users current location, or any other available service through which location information data can be obtained.

Figure 1:
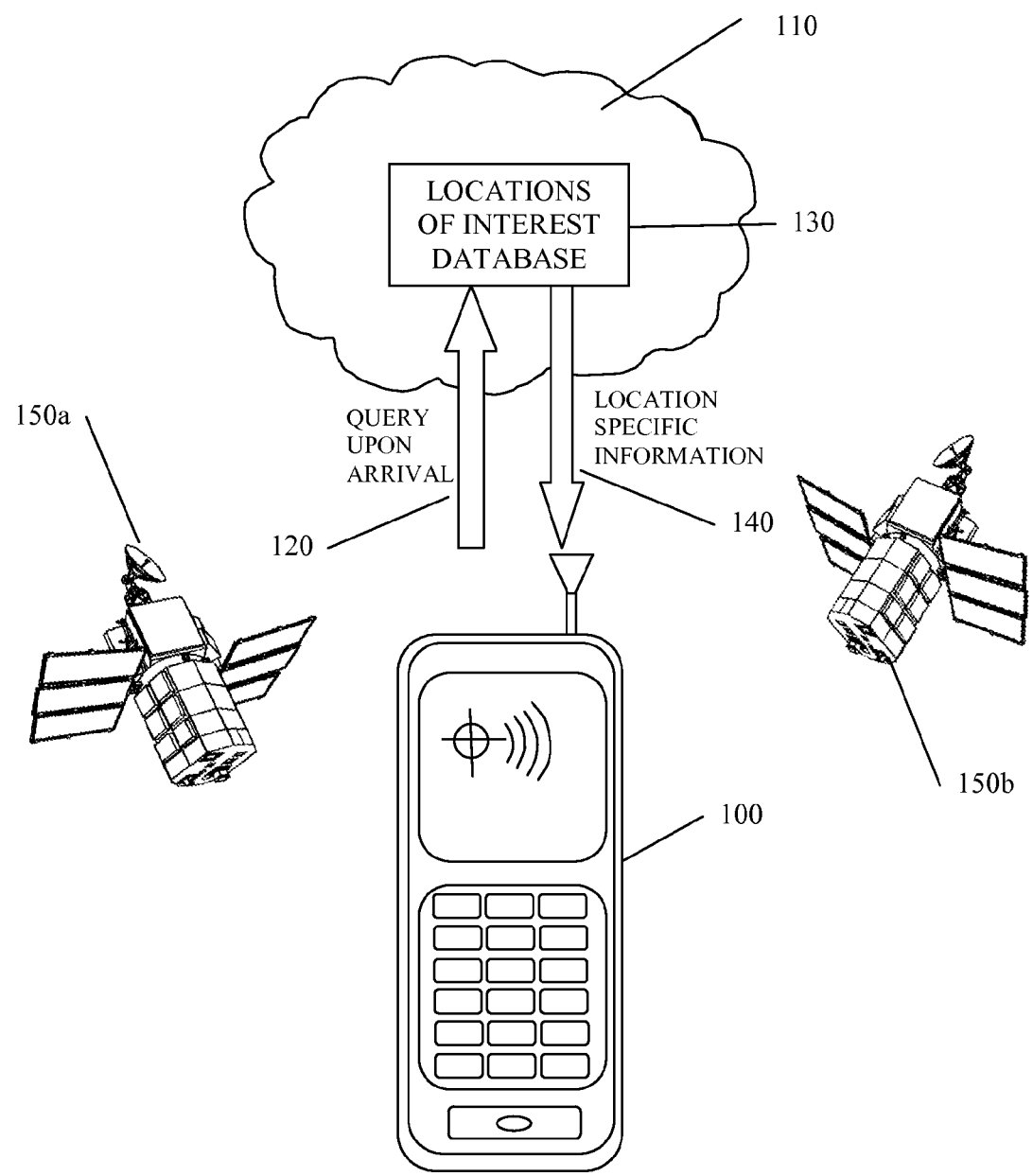
FIG. 1 illustrates a wireless device in communication with a wireless network.

In FIG. 1, a wireless device 100 is pictured interacting with a wireless access network, which is generally depicted by cloud 110. The wireless device 100 is capable of having two way communications with a Locations of Interest Database 130 located within the cloud 110. A representative communication between the two devices is shown. The wireless device 100 sends a query upon arrival 120, to the Locations of Interest Database 130 and receives location specific information 140 back from the database.

It is appreciated that the wireless access network hardware may take many forms, for example, fiber optics, wireless links, and even satellite links, all within cloud 110. Additionally, the wireless device 100 may also receive information from one or more external sources of information represented by 150a and 150b. The external sources of information may be things such as GPS satellites, local area networks, or other items such as blue tooth networks that broadcast a signal that can be used by LBS to determine the physical location of the wireless device 100.

During typical operation, the wireless device 100 will use LBS to process requests for location-based information stored internally and upon arrival at a new location (not shown) will query the Locations of Interest Database 130 for any information specific to this new location.

Figure 2:
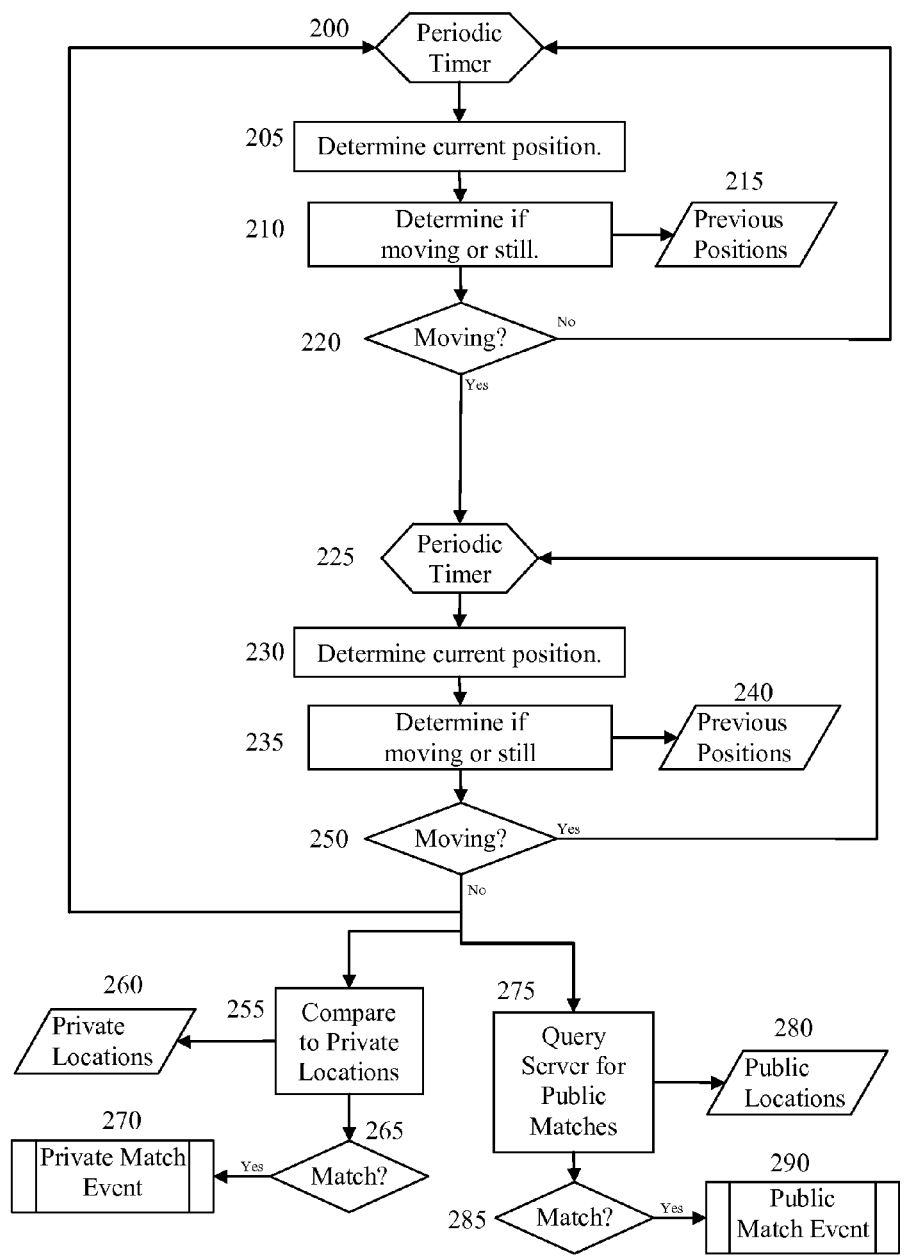
FIG. 2 is a block diagram showing an embodiment of the present invention.

FIG. 2 shows a block diagram of an embodiment in accordance with the present invention. A periodic timer 200 is used to initiate a process 205, which is to determine the current position of wireless device 100, using its internal LBS. After determining the current position, the next step is to execute process 210, determining if the wireless device is moving or is still. Process 210 may necessitate accessing a database of previous positions 215, if this information is not directly available through the LBS.

Whether the wireless device is "still" is a relative term, because every location technology has some inherent inaccuracy, including GPS. As a result, position measurements will often fluctuate around the object's true position (or possibly be offset from a devices true position). Therefore, a wireless device will never truly be still. As a result, the approach typically taken is to say that a device is moving when you can no longer determine that it is still. A simple approach to making this determination is to compare the previous location to the current location and if the distance between the two is above a pre-determined threshold then a determination is made that the device is no longer still and is therefore moving. A more sophisticated approach is to do a running average and compare the distance to the average of the last several know positions. However, the preferred implementation is to utilize cluster analysis, or its equivalent.

Cluster analysis is the technique of identifying positions that deserve to be grouped together into an object referred to as cluster. When positions can no longer be grouped together then a new cluster is formed. The formation of a new cluster would be indicative that the device is no longer still.

One method of performing cluster analysis is to utilize the ISODATA clustering algorithm. This algorithm is disclosed in Therrien, C. W. "Decision, Estimation and Classification", John Wiley & Sons, 1999, and the explanation of this algorithm, which is contained therein is hereby incorporated by reference.

It is anticipated that process 210 (and process 235 to be introduced shortly) and its related decision 220 (and related decision 250 to be introduced shortly) may also incorporate within its definitions of "moving" and "still" some time related and/or velocity related measures. For example, if you are stopped at a traffic light then all of the techniques mentioned above will indicate that you are "still" even though in truth you are still in transit. Therefore, adding a time based component, such as if you are not "still" for at least 30 seconds then the decision step will indicate that you are still potentially moving. With respect to velocity, the definition of whether or not you are "moving" or "still" could be based on systems settings such as whether or not you typically walk or drive between locations or adjusted based upon measured velocity.

At decision 220, if you are not moving then the system would loop back to wait for the periodic timer 200 to initiate the cycle again.

At decision 220, if you are moving then a second periodic timer 225 will be utilized to track your position during movement. While periodic timer 200 and 225 could be one in the same, they are indicated as two separate timers each optimized to the task-at-hand. Additionally, while periodic timer 200 would conceivably have a fixed, or infrequently changing frequency, it is anticipated that periodic timer 225 may be dynamic and inversely proportional to velocity of travel such that the faster you are traveling the less frequently your position will need to be measured, if the focus is on determining arrival at a new location.

Periodic timer 225 is used to initiate the process 230 (similar to process 205), which is to determine the current position of wireless device 100, using its internal LBS. After determining the current position the next step in to execute process 235, which is to determine if the wireless device is moving or is still, which may necessitate accessing a database of previous positions 240, if this information is not directly available through the LBS.

Previous positions database 240 and previous positions database 215 are indicated as different databases but may be one in the same.

Likewise, processes steps 235 and 210 are very similar but would have their respective parameters optimized for their respective tasks. For example, when trying to determine whether or not you are staying in one place at step 210 the cluster parameters may tighten the longer you stay in one place. However, when you first are trying to determine that someone has arrived, step 235, the cluster parameters may broaden such that the activities of parking your car and then walking to the place that you want to go will trigger the fact that you are no longer moving.

At decision 250, if you are moving then the system would loop back to wait for the periodic timer 235 to initiate the cycle again.

At decision 250, if you are no longer moving and it is determined that you have arrived at a new location then a parallel process will loop back to periodic timer 200 and the process of monitoring whether or not you are remaining at the current location will begin again.

At decision 250, if you are no longer moving then steps 255 and 275 will also be initiated.

At process 255, your current location will be compared to the private locations database 260, which will be local to wireless device 100. The comparison will not only include geographic proximity but may also include time of day, day of the week, and date comparisons (e.g. send me a message to "run away" if I am at the cemetery on Friday the 13$^{th}$, after midnight.) If there is a match at decision 265 then step 270 will be initiated.

At step 270 appropriate actions are taken to present the associated private location information to the user. Additionally step 270 could also kick off an entirely new application either within the wireless device 100 or within the cloud 110, such as opening a web browser and launching a web application.

As opposed to just looking for "private" locally stored matches, process 275 will query the server (the locations of interest database 130) to determine if there are any matches to the current location within public locations database 280. Similar to process 255, process 275 will not only include comparison based on geographic proximity but may also include additional parameters such as time of day, day of the week and date comparisons. However, unlike process 255 where it would be assumed that you would always want to see matches. It is anticipated that step 275 would also have the ability to exclude matches based upon geographic proximity to specific locations (e.g. do not show me public matches within 5 miles from my home). Additionally, the user would have the option to only request specific categories of information (e.g., only information related to healthy eating that is highly rated by other users). If there is a match at decision 285 then step 290 will be initiated.

In process 275 the query the server (the locations of interest database 130) to determine if there are any matches to the current location within public locations database 280 could either require authentication, be anonymous, or a combination of the two. For example, the initial connection could require authentication and then once authenticated could then be passed to an anonymous connection that did not track user information.

At step 290 appropriate actions are taken to present the associated public location information to the user. Additionally step 290 could also kick off an entirely new application either within the wireless device 100 or within the cloud 110.

Figure 3:
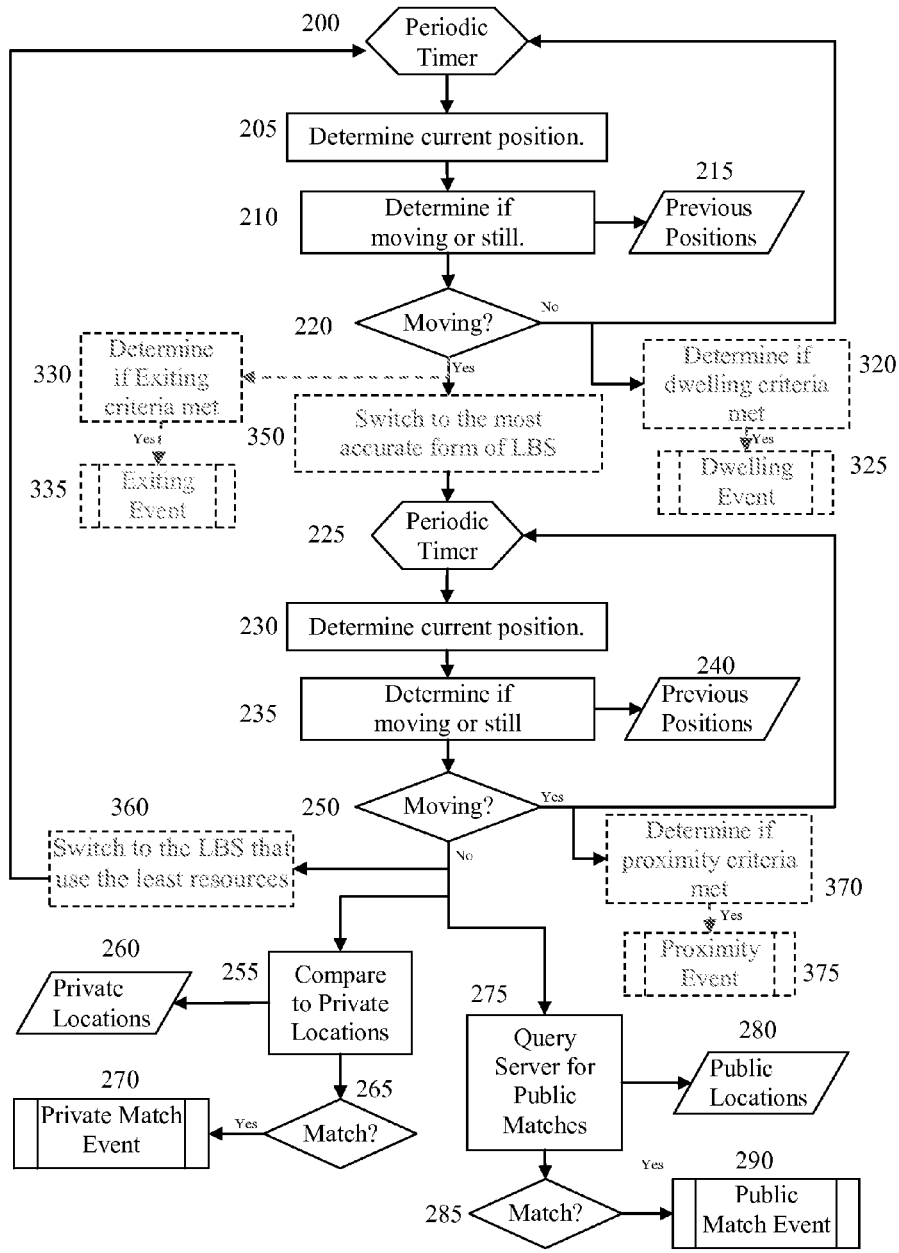
FIG. 3 is a block diagram showing an enhanced embodiment of that shown if FIG. 2.

FIG. 3 shows an enhance version of the embodiment shown in FIG. 2.

At decision 220, if it is determined that wireless device 100 is not moving then instead of just returning back to the periodic timer 200, an additional parallel process 320 has been added. Process 320 is used to determine if dwelling criteria has been met based upon the length of time a person has remained in a location. If so then dwelling event step 325 will be initiated.

The combination of process 320 and step 325 could either be generic to any location (e.g. increasing the duration of periodic timer 200 after the person has been in the same location for more than 5 minutes) or specific to a particular location and time (e.g. sending a text message to my AA sponsor if I am at a bar for more than 5 minutes and it is after 8 PM).

At decision 220 if it is determined that wireless device 100 has begun moving then an additional parallel process 330 has been added to determine if an exiting event criteria has been met and, if so then exiting event step 335 will be initiated. The combination of process 330 and step 355 could either be generic to any location (e.g. resetting the duration of periodic timer 200 to the default value) or specific to a particular location (e.g. if arriving at this location caused either private match event 270 or public match event 290 to execute then launch a survey to ask for feedback about user's experience at this location).

Similar to the way parallel process 320 was added when wireless device 100 has been determined not be moving, process 370, determining if the proximity criteria was met, was added off of decision 250. However, in this particular case, parallel process 370 is initiated when it is determined that wireless device 100 is still moving, rather than remaining still.

Process 370 would take into account not only whether the current object is within a prescribed geometric area (e.g. within 25 miles of a particular casino) but would also be anticipated to take into account direction of travel information. For instance, if a compulsive gambler is heading in the direction of Atlantic City N.J. They might receive a message when they are within 25 miles of Atlantic City. However, rather than Atlantic City there true intention may have been to visit their cousin, which is within 10 miles of Atlantic City. Without taking additional information into account they would get a second message about Atlantic City as soon as they left their cousins house, which might be counterproductive in this particular case. Instead, it is anticipated that the system would also take into account direction of travel. An example of how this might be implemented in the case of when an individual starts from within a geographic area that previously caused step 375 to execute would be to utilize a percentage (25%, 50% . . . etc.) of the distance between the departure location and the center of the geometric area. A more sophisticated approach that is anticipated would be to use a mapping function that calculates probable routes to a desired location and determining if the route is being followed and then step 375 would only be initiated if one of the probably routes was being followed. Using the probable routes approach has the advantage that a user could potentially travel through the periphery of a geographical area without causing step 375 to be initiated.

Figure 4A:
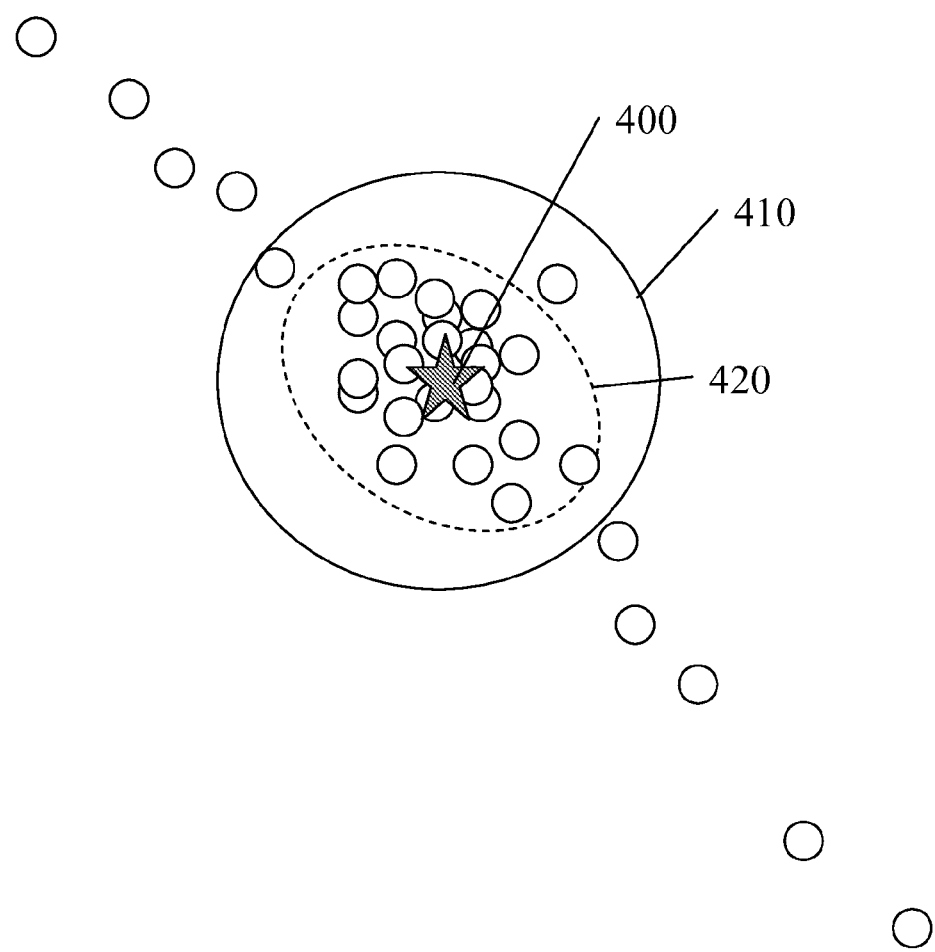
FIGS. 4A, 4B, and 4C are representative of positioning data.
Figure 4B:
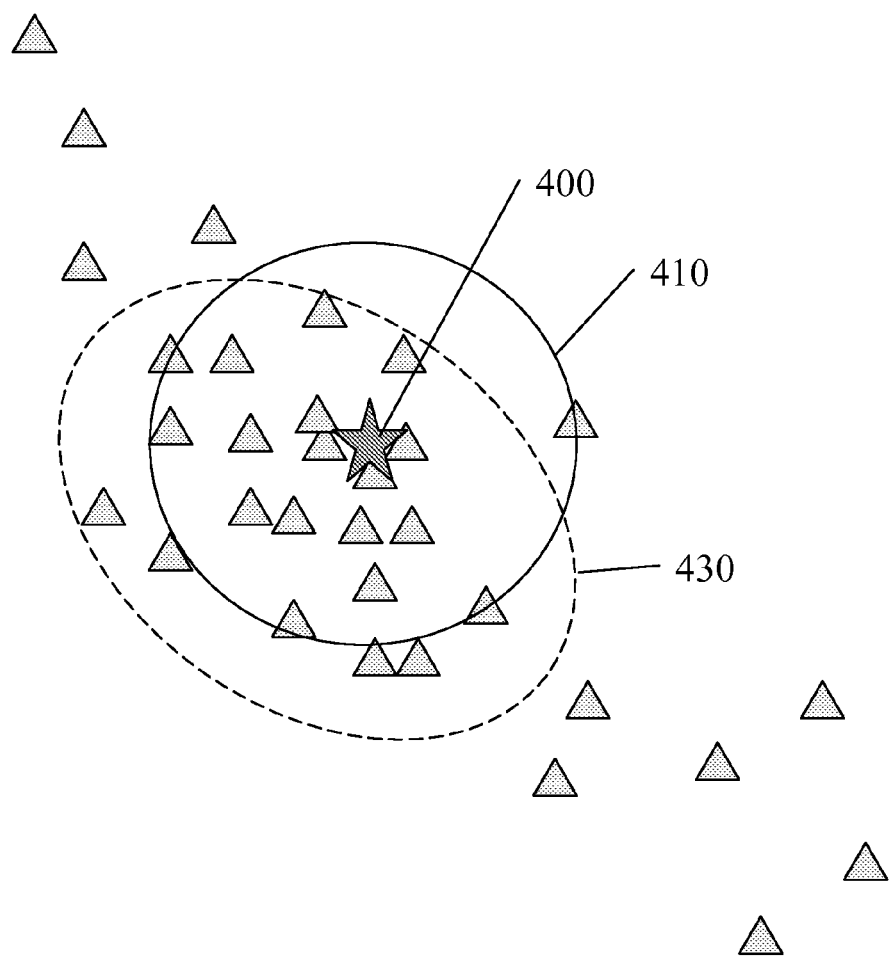
Figure 4C:
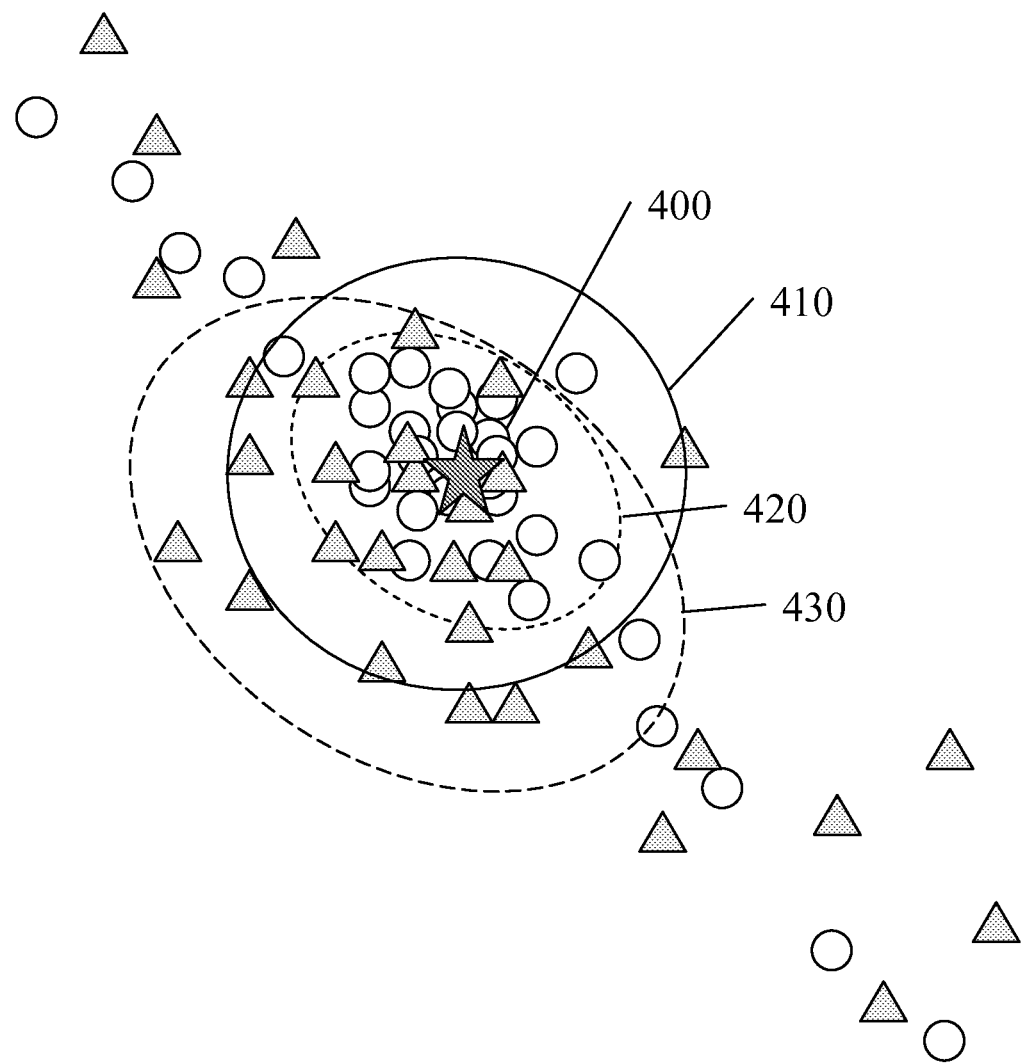

FIG. 3 also shows two additional processes 350 and 360. Process 350 has been added between decision 220 and periodic timer 225 and process 360 has been added between decision 250 and periodic timer 200. These two processes would be utilized together in order to efficiently utilize LBS services if more than one source is available. For example, there is no need to utilize GPS satellite tracking while an individual is in bed sleeping. However, while an individual is traveling, you want the most precise LBS available. An illustration of the impact of switching between LBS can be seen in FIGS. 4A-C FIG. 4A represent represents sample data of an object traveling from the upper left corner and stopping at a true location 400 (indicated by the star) and then moving off in the direction of the lower left hand corner. Due to the inherent inaccuracy of LBS, rather than being located directly on the true location 400, the points are clustered within a region defined by 420 while the object remains at true location 400. In this figure, 410 represents a generic radius around the true location 400.

FIG. 4B represents the same scenario as in FIG. 4A, however, in this particular case, less accurate LBS are utilized. 430 is representative of the geometric cluster of points while the object is stopped at true location 400. In this particular case not only is 430 bigger than generic radius 410 but it isn't even centered around the true location, which can often be the case of less accurate LBS.

FIG. 4C shows the sample data from FIG. 4B overlaid on top of the sample data from FIG. 4A so that the two distributions can be compared. While the cluster represented by 430 would be sufficient for determining when the object has left the current location and has begun moving. It is less accurate than the cluster 420, which would be more desirable for determining a precise location.

Embodiments of the present invention have many uses. For example, an entertainment/personal use might be to customize a planned hiking trip along the Appellation Trail with your planned camping sites and then receive public information from other hikers at various point of interest along the way. A business usage might be when a user has a planned shopping trip to the mall and then receives alerts to special sales when they arrive.

One particular usage that is anticipated to be of particular value is in providing therapeutic interventions to people with medical and mental health issues and in particular in helping these people to make better choices.

FIG. 5 shows a sample input screen that a user might see in a system designed to provide location-based therapeutic intervention. The user would have the ability to specify locations that were problematic to them. (Note: the user might be able to select locations on a map or might enter an address directly, which would then be converted to geographic coordinates through the process of geocoding.) The user could then optionally select dates and times that make this location problematic. The user could also add information for themselves such as people and events that make the situation particularly problematic. The user could then record intervention strategies (textual, auditory, video . . . etc.) that would be helpful to themselves (or shared with others) when they either arrive at the location or are within its geographic proximity. They could also add people they may want to contact in the event that they arrive at a particular location and are in crisis (e.g. an alcoholic arriving at a bar after having lost their job earlier that day).

FIG. 5 is only a sample input screen, additional options include but are not limited to having a therapist input screen where a therapist working with a particular patient could record intervention strategies that would then be downloaded by a specific user. Additionally, various professionals such as nutritionist could add generic intervention strategies across a category (e.g. fast food restaurants) or the user could record their own generic strategies such as a diabetic reminding himself or herself anytime that they arrive at a place to eat to during meal times that they need to take their blood sugar level.

Figure 6:
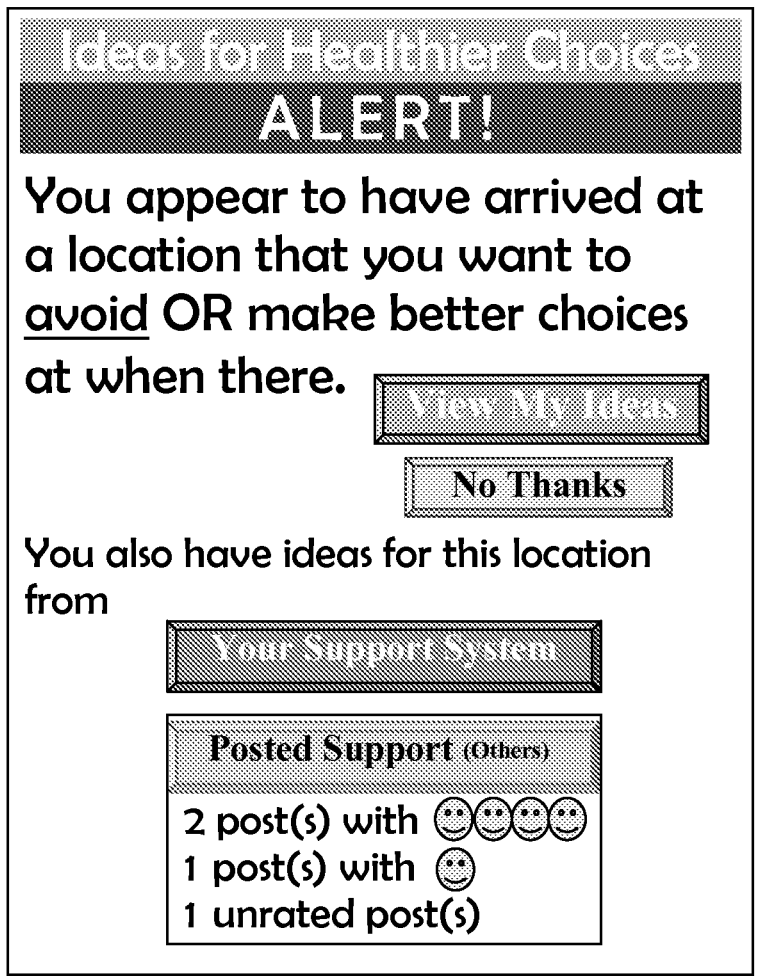
FIG. 6 illustrates a sample user output screen.

FIG. 6 represents one of many possible version of a sample output screen that a user might see in a system designed to provide location-based therapeutic intervention. Upon arriving at a previously specified location, the user would receive a notification that they had various types of interventions strategies available to them that they could either review or ignore.

In addition to inputting and receiving alerts, such a system would be capable of producing reports. Sample reports include how often and how long a user spent at a particular location; the self-reported effectiveness of the strategies presented; and even whether or not the user had turned off the system and for how long, which could be computed by comparing the time stamp of the last recorded data point with the time stamp at start-up.

[Note: while it is anticipated that the process functions would be partitioned as specified between what is server based and what is performed within the wireless device, in order to optimize privacy and system resources, an embodiment of the present invention specifically related to providing location-based therapeutic intervention would be to push all of the functions related to location processing and data storages functions to the server.]

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

I claim:

1. A wireless device location-based messaging system, comprising:
   a wireless device operating within a wireless network;
   said wireless device including one or more location-based messaging services and
   at least one locally stored database of information related to particular geographic locations;
   said wireless network including at least one network based database of information related to particular geographic locations;
   said wireless device and the network based database having an ability to establish a two-way communication channel; and
   said wireless device includes an ability to detect when said wireless device has arrived at a new location and
   then to query both said locally stored database of information related to particular geographic locations and
   said network based database of information related to particular geographic locations and
   to process any related matches, wherein the information related about a particular geographic location is related to therapeutic intervention.

2. The system of claim 1 further comprising an ability to establish a connection between said wireless devices and said network based database of information related to particular geographic locations that is anonymous.

3. The system of claim 1 further comprising an ability to determine if said wireless device is dwelling at a location and, if pre-established criteria are met, trigger a related dwelling event.

4. The system of claim 1 further comprising an ability to determine if said wireless device is exiting from a location and, if pre-established criteria are met, trigger a related exit event.

5. The system of claim 1 further comprising an ability to switch between different location-based services in order to efficiently utilize those services.

6. The system of claim 1 further comprising an ability to determine if said wireless device is within the proximity of a location and, if pre-established criteria are met, trigger a related proximity event.

7. The system of claim 1 wherein the ability to detect uses cluster analysis.

8. The system of claim 7 wherein said therapeutic intervention is related to helping people make better choices.

9. A method of providing location-based messaging to a user of a wireless device that contains location-based services and is operating within a wireless network, comprising:
- determining the current position of said wireless device;
- determining if said wireless device is moving or still;
- determining if said wireless device has arrived at a new location;
- querying the wireless device for location specific information related to said new location and presenting it to said user;
- establishing a connection between said wireless device and a database contained in said wireless network;
- querying said database contained in said wireless network for location specific information related to said new location and
- presenting it to said user, wherein the information related about a particular geographic location is related to therapeutic intervention.

10. The method of claim 9 wherein establishing a connection between said wireless device and said database contained in said wireless network is done in an anonymous fashion.

11. The method of claim 9 further comprising determining if said wireless device is dwelling in a particular location and whether pre-defined criteria are met and launching, as appropriate, a dwelling related event.

12. The method of claim 9 further comprising determining if said wireless device is exiting from a location and whether pre-defined criteria are met and launching, as appropriate, an exit related event.

13. The method of claim 9 further comprising switching between different location-based services in order to efficiently utilize those services.

14. The method of claim 9 further comprising determining if said wireless device is within the proximity of a location and whether pre-defined criteria are met and launching, as appropriate, a proximity related event.

15. The method of claim 9 wherein the determining if said wireless device is moving or still is done using cluster analysis.

16. The method of claim 15 wherein said presenting of information to said user is done for said purpose of providing said therapeutic benefit that is related to helping people make better choices.

17. A method of providing location-based therapeutic messaging to a user of a wireless device that contains location-based services and is operating within a wireless network, comprising:
- determining the current position of said wireless device;
- determining if said wireless device is moving or still;
- determining if said wireless device has arrived at a new location;
- querying one or more databases that contain specific information related therapeutic intervention at said new location and presenting said therapeutic intervention to said user.

18. The method of claim 17 wherein establishing a connection between said wireless device and said one or more databases that contain specific information related therapeutic intervention is done in an anonymous fashion.

19. The method of claim 17 further comprising determining if said wireless device is exiting, dwelling, or in the proximity from a location and if certain pre-defined criteria are met launching a related event.

20. The method of claim 17 wherein said presenting of said therapeutic intervention to said user is related to helping people make better choices.

* * * * *